Dec. 16, 1947.  J. R. DESCH ET AL  2,432,608
MULTIANODE, GAS-FILLED DISCHARGE DEVICE
Filed March 28, 1941  7 Sheets—Sheet 1

Joseph R. Desch and
Robert E. Mumma
Inventors

By Carl Benst
Their Attorney

Joseph R. Desch and
Robert E. Mumma
Inventors

By Earl Benst
Their Attorney

Dec. 16, 1947.          J. R. DESCH ET AL          2,432,608
          MULTIANODE, GAS-FILLED DISCHARGE DEVICE
              Filed March 28, 1941          7 Sheets-Sheet 3
FIG. 5
FIG. 6
FIG. 7
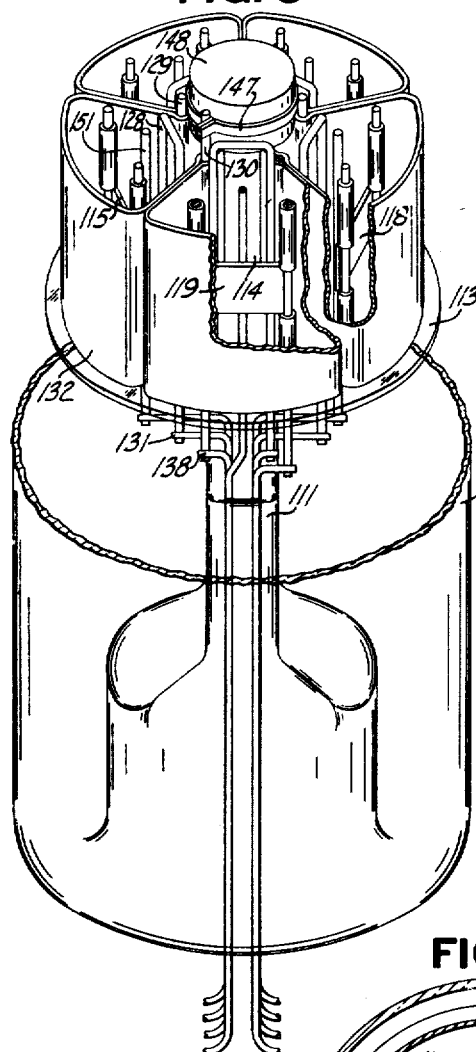
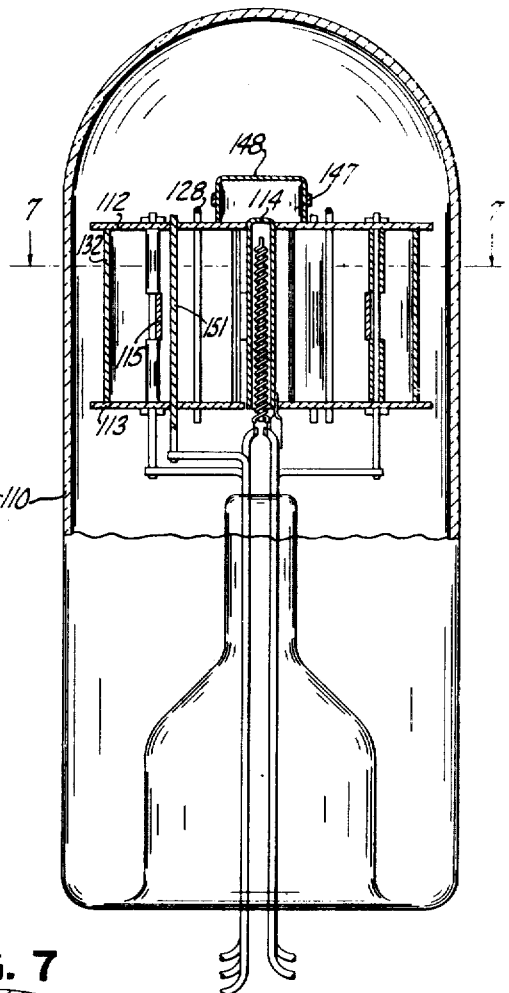
Joseph R. Desch and
Robert E. Mumma
Inventors
By *Hearl Bennett*
Their Attorney Dec. 16, 1947.  J. R. DESCH ET AL  2,432,608
MULTIANODE, GAS-FILLED DISCHARGE DEVICE
Filed March 28, 1941  7 Sheets-Sheet 4

Joseph R. Desch and
Robert E. Mumma
Inventors
By Earl Benst
Their Attorney

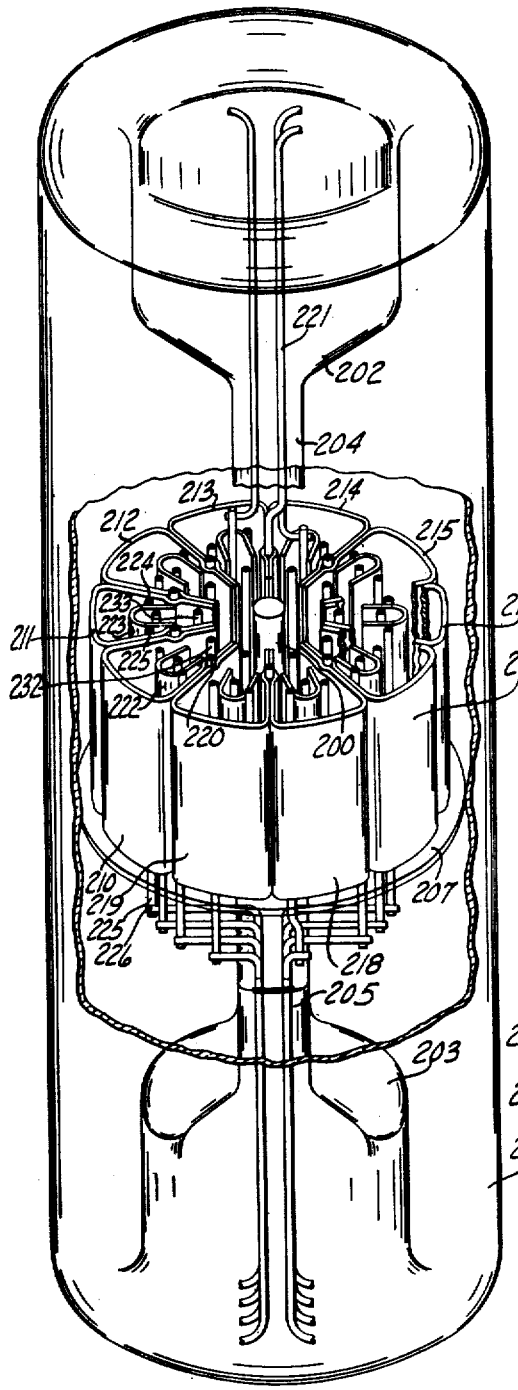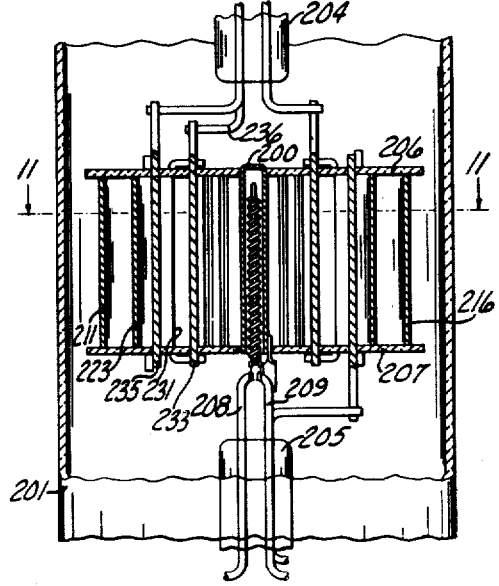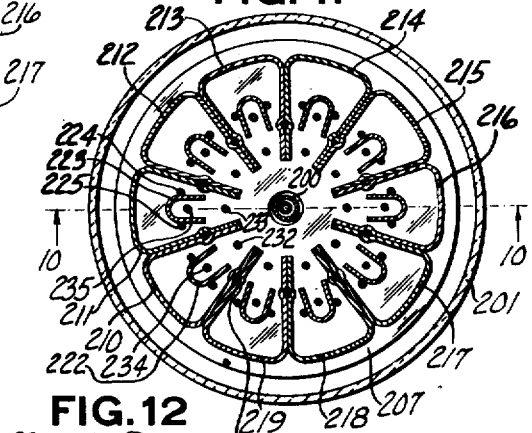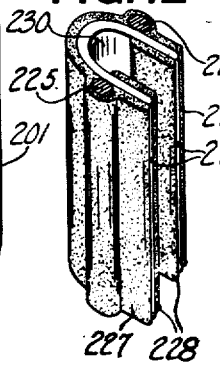
Joseph R. Desch and
Robert E. Mumma
Inventors
By Carl Beust
Their Attorney Dec. 16, 1947.        J. R. DESCH ET AL        2,432,608
MULTIANODE, GAS-FILLED DISCHARGE DEVICE
Filed March 28, 1941        7 Sheets-Sheet 6

Joseph R. Desch and
Robert E. Mumma
Inventors

By *Carl Bennett*

Their Attorney

Dec. 16, 1947.   J. R. DESCH ET AL   2,432,608
MULTIANODE, GAS-FILLED DISCHARGE DEVICE
Filed March 28, 1941   7 Sheets-Sheet 7

Joseph R. Desch and
Robert E. Mumma
Inventors

By *(signature)*

Their Attorney

Patented Dec. 16, 1947

2,432,608

UNITED STATES PATENT OFFICE 2,432,608

MULTIANODE, GAS-FILLED DISCHARGE DEVICE

Joseph R. Desch and Robert E. Mumma, Dayton, Ohio, assignors to The National Cash Register Company, Dayton, Ohio, a corporation of Maryland Application March 28, 1941, Serial No. 385,732

17 Claims. (Cl. 250—27.5)

This invention relates to an electron discharge device and connections between the elements of such a device and more particularly pertains to a gaseous electron discharge tube having a plurality of anodes connected in a sequential operative series so that they may be enabled one at a time in determined sequence to receive a discharge of electrons from a common cathode.

The novel electron discharge device herein disclosed comprises a gas-filled envelope having a central cathode, a plurality of anodes arranged around the cathode, a discharge control element associated with each anode whereby electron flow to the associated anode may be controlled by application of a controlling electric potential thereon, and a current tapping electrode member associated with each of the anodes and positioned in the gas in the region of highest ionization, which tapping electrode member may be impressed with an electric potential whereby, upon a discharge occurring to its associated anode, the tapping electrode will, by means of a coupling to the control element associated with the anode next in the sequential series, lessen the control of said control element associated with the next anode of the sequential series to the exclusion of the other anodes and their control members. By electric impulses of a certain value impressed on all the control elements, the control element associated with the anode next in the operative series may be caused to lose control, causing a discharge to the associated anode. The coupling between any of the current tapping electrodes and the control element associated with the next anode of the series is shown in the disclosed embodiment as made outside the envelope of the tube for the purpose of economizing space within the envelope. The presence of such connections within the envelope is not necessary to the proper functioning of the electron discharge device, but may be made therein if desired. Hereinafter, in references to the electron discharge device, such couplings are to be considered as a part of the device.

The multiple-anode gaseous electron discharge device disclosed is intended to provide, in a single envelope and a single gaseous medium, what has heretofore required a plurality of envelopes and a plurality of gaseous mediums equal in number to the required number of anodes. The electron discharge device, among other things, may be operated to perform the same functions as performed by a counting ring for numerical data, said rings, as heretofore known in the art, comprising a plurality of electron tubes operable one at a time under the differential control of electric impulses, each of the tubes of such a ring representing a digit of a denomination or some other unit of data. The anodes of the herein-disclosed novel electron discharge device may each represent a denominational digit or other unit of data, thereby combining within one envelope what has heretofore required a plurality of envelopes. Attention is directed to the applications for United States Letters Patent, Serial No. 325,040, filed March 20, 1940, by Joseph R. Desch and Robert E. Mumma, and Serial No. 364,716, filed November 7, 1940, by Robert E. Mumma, which application Serial No. 364,716, issued on July 30, 1946, as Patent No. 2,405,095, for electronic counting rings requiring a plurality of electron tubes to obtain a result analogous to that obtained by the single electron discharge device disclosed herein.

As will be described, the multiple-anode electron discharge device also may be made self-operating; that is, without the aid of applied electric impulses, to automatically produce high-frequency electric impulses.

The electron discharge device, although primarily intended to be used for counting or producing electric impulses, may also be used for switching purposes for controlling any one of a plurality of operations as selected, each anode representing and controlling, by its state of conduction or non-conduction, a certain operation.

Therefore, the principal object of this invention is to provide an electron discharge device having a plurality of anodes cooperating with a single cathode whereby its electron emission may be controlled by novel means to be received by the anodes one at a time in sequence.

Another object of the invention is to provide an electron gas discharge device having a single cathode, a plurality of anodes, and control elements whereby the anodes are caused to conductively function in determined sequence.

Another object of the invention is to provide an electron gas discharge device comprising within a single envelope and a single continuous gaseous medium a plurality of digit-representing anodes, a cathode, and control means whereby the anodes may be caused to conduct individually in sequence one at a time in response to external control whereby the condition of one of the anodes conducting represents digital numerical data.

Another object of the invention is to provide a multiple-anode electron gas discharge device operable to be responsive to electric impulses whereby the anodes conduct one at a time in predetermined sequence, a received impulse causing a step in the sequential operation to occur.

Another object of the invention is to provide a multiple-anode gaseous electron discharge device wherein each anode is shielded mechanically and electrostatically against firing by reason of the occurrence of gas discharge ionization produced by the conductive state of any of the other anodes.

Another object of the invention is to provide a multiple-anode gaseous electron discharge device wherein the discharge ionization caused by a discharge to one anode is by electrostatic and mechanical shielding prevented from initiating by itself a discharge to any of the other anodes.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of the drawings:

Fig. 5 is a perspective of a modified form of the five-section electron discharge device of Fig. 1.

Fig. 6 is an elevation of the electron discharge device of Fig. 5, part being in section on the line 6—6 of Fig. 7.

Fig. 7 is a section through the electron discharge device of Fig. 5 on the line 7—7 of Fig. 6.

Fig. 9 is a perspective view of a ten-section electron discharge device, a modification of the device shown in Fig. 1, with certain parts broken away.

Fig. 10 is a part elevation in section of the electron discharge device of Fig. 9 on the line 10—10 of Fig. 11.

Fig. 11 is a section through the electron discharge device of Fig. 9 on the line 11—11 of Fig. 10.

Fig. 12 is a detail of one of the anodes of the electron discharge device of Fig. 9, showing the method of insulating the anodes at certain points against contact by electrons.

Figure 14:
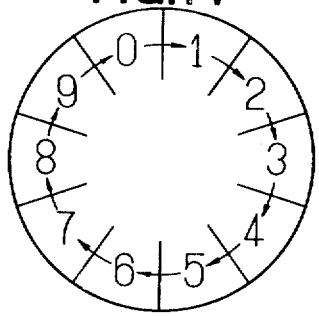
Figure 15:
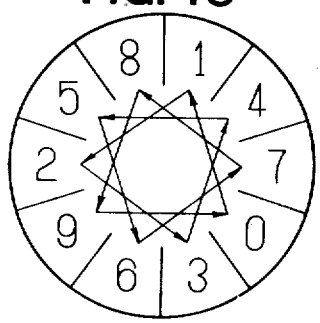
Figure 16:
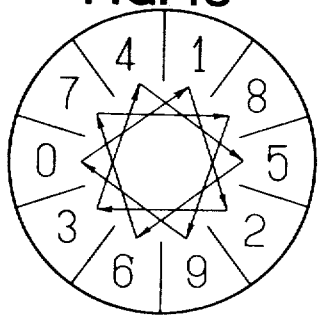

Figs. 14, 15, and 16 are diagrams showing optional methods of numbering and determining the order of operation of a ten-section electron discharge device.

Figure 17:
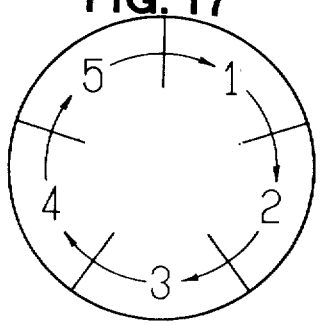
Figure 18:
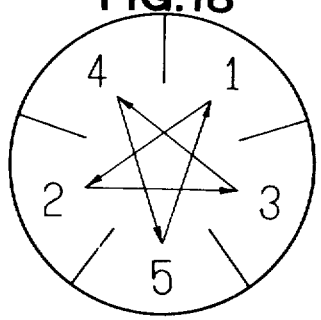
Figure 19:
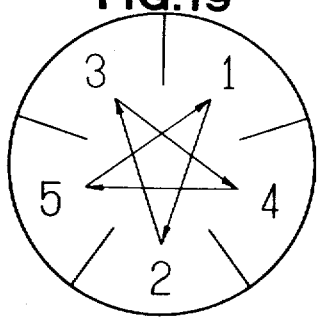

Figs. 17, 18, and 19 are diagrams showing optional methods of numbering and determining the order of operation of a five-section electron discharge device.

*General description*

Figure 1:
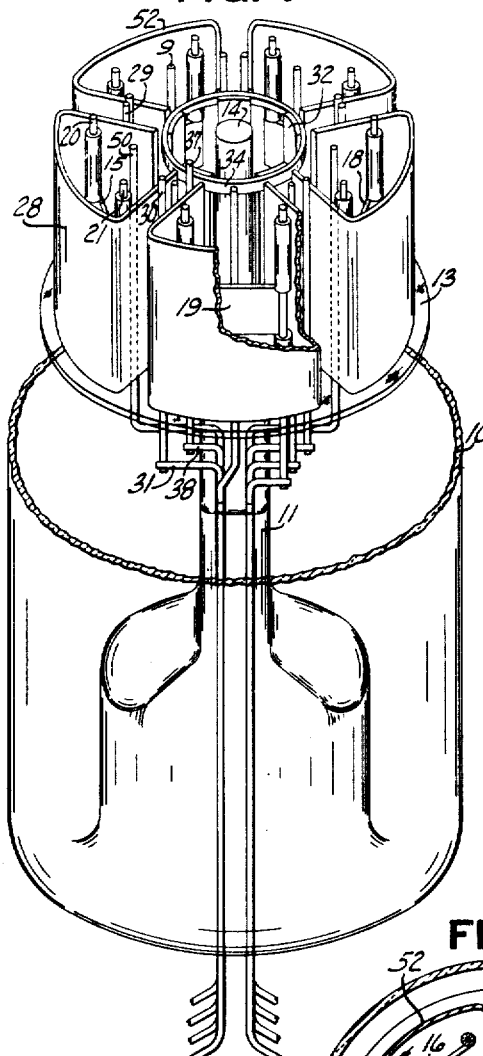
Fig. 1 is a perspective view of a five-section electron discharge device with certain parts broken away.
Figure 2:
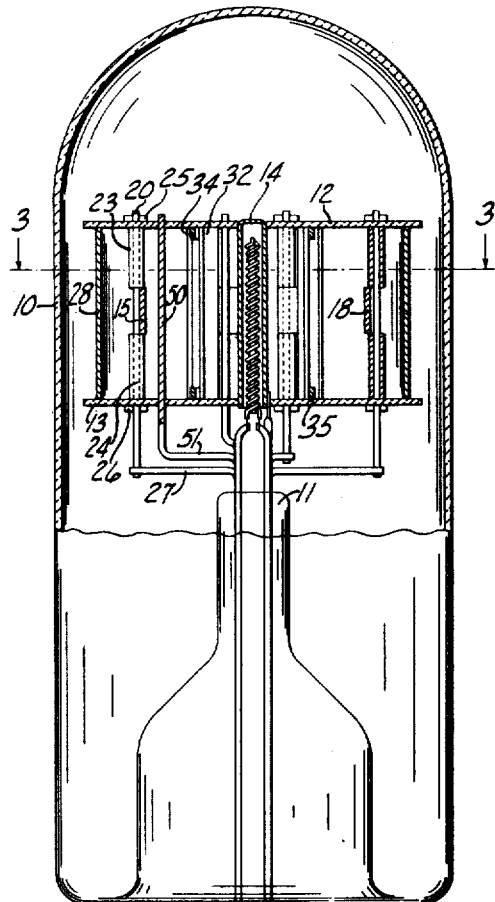
Fig. 2 is an elevation of the electron discharge device of Fig. 1, part being in section on the line 2—2 of Fig. 3.
Figure 3:
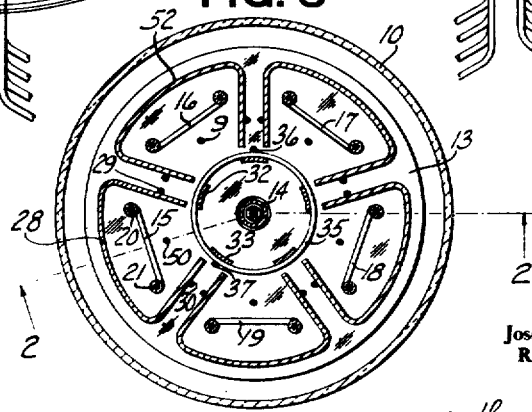
Fig. 3 is a section through the electron discharge device of Fig. 1 on the line 3—3 of Fig. 2.

Referring to Figs. 1, 2, and 3, the electron device therein disclosed comprises a glass envelope 10 having a pressed stem 11, into which are sealed the conductors from the electrode elements in the envelope. The glass envelope contains one of the ionizable inert gases to cause a typical gas discharge between a cathode and an anode when proper operating potentials are applied. The electrodes are supported between an upper insulating disc 12 (Fig. 2) and a lower insulating disc 13, the discs being of mica or other equivalent substance. The electrodes comprise a rod-like indirectly-heated cathode 14 (Figs. 1, 2, and 3), around which are arranged anodes 15, 16, 17, 18, and 19 equidistant from one another and from the cathode, as is best seen in Fig. 3. Each anode is fastened to vertical support rods such as rods 20 and 21, which support anode 15, each of said rods having ceramic insulating sleeves such as sleeves 23 and 24 (Fig. 2), which also act as spacers for positioning the anodes centrally between the mica discs 12 and 13. The rods 20 and 21 project through the mica and have clips fastened on the ends, such as clips 25 and 26, on the outside of the discs to fasten the discs and the anode structure into a rigid assembly. One rod from each plate, such as rod 20, is fastened to a conductor, such as conductor 27, which is pressed in the stem 11, thus acting as a conductor to the outside of the envelope and as a partial support for the insulating discs 12 and 13 and their supported elements. Laterally surrounding each anode except for an aperture facing the central cathode is a control grid, such as grid 28 (Figs. 1, 2, and 3), its cross-section being sector-shaped but open at the cathode end, as shown in Fig. 3, and extending from the top disc 12 to the bottom disc 13, as shown in Fig. 2. Each control grid is fastened to two support rods, such as rods 29 and 30 (Figs. 1 and 3), which support grid 28, said rods being held in holes in the top disc 12 and the bottom disc 13. One of the supporting rods of each grid, such as rod 30 (Fig. 1), is fastened to a conductor, such as conductor 31, which leaves the envelope 10 through stem 11, said conductors affording additional support to the electrode assembly.

As shown in Fig. 3, the cathode 14 may emit electrons directly to any of the anodes, and the anodes themselves are to a large extent mechanically shielded from one another by the sector-shaped control grids forming, in conjunction with the insulating discs, a cell-like enclosure or section for each anode. When a discharge is occurring between the cathode 14 and one of the anodes—for example, anode 15 (Fig. 3)—the ions in the highly-ionized gas near the anode 15 may be substantially prevented from escaping the mechanical shielding confines of the control grid 28 by means of electrostatic shielding members, such as members 32 and 33, one of which shielding members is positioned adjacent the vertical edges of each two adjacent control grids, which members in operation may be positively charged, thus largely preventing any tendency for the ions to migrate in great numbers to another anode in the envelope. The cathode-anode potential is selected so as to drive the principal discharge ionization to within the confines of the grid of the functioning anode. The electrostatic shielding members, such as 32 and 33, are fastened at the top of a ring 34 (Figs. 1 and 2) and at the bottom to a ring 35 (Figs. 2 and 3), which rings in turn are supported by rods 36 and 37 (Fig. 3), which extend into the insulating discs 12 and 13. The rod 37 is fastened to a conductor 38 (Fig. 1), which extends through the stem 11 to the outside of the envelope.

In the gas between each anode and the cathode is a current-tapping member, like member 50 (Figs. 1, 2, and 3), positioned in the region of densest discharge ionization between the cathode and the associated anode. Each tapping member consists of a vertical rod extending from the top mica disc 12, passing on the cathode side of the anode and through the bottom disc 13, where it is made a conductor 51 (Fig. 2), which leaves the envelope through the stem. Externally of the envelope, the members 50 are connected through resistances to the control grid of the anode next in the sequential series. The anodes are shown in Fig. 4 as being connected in an operative series proceeding in a clockwise manner, the discharge proceeding from one anode to the next adjacent anode in a clockwise direction.

Figure 4:
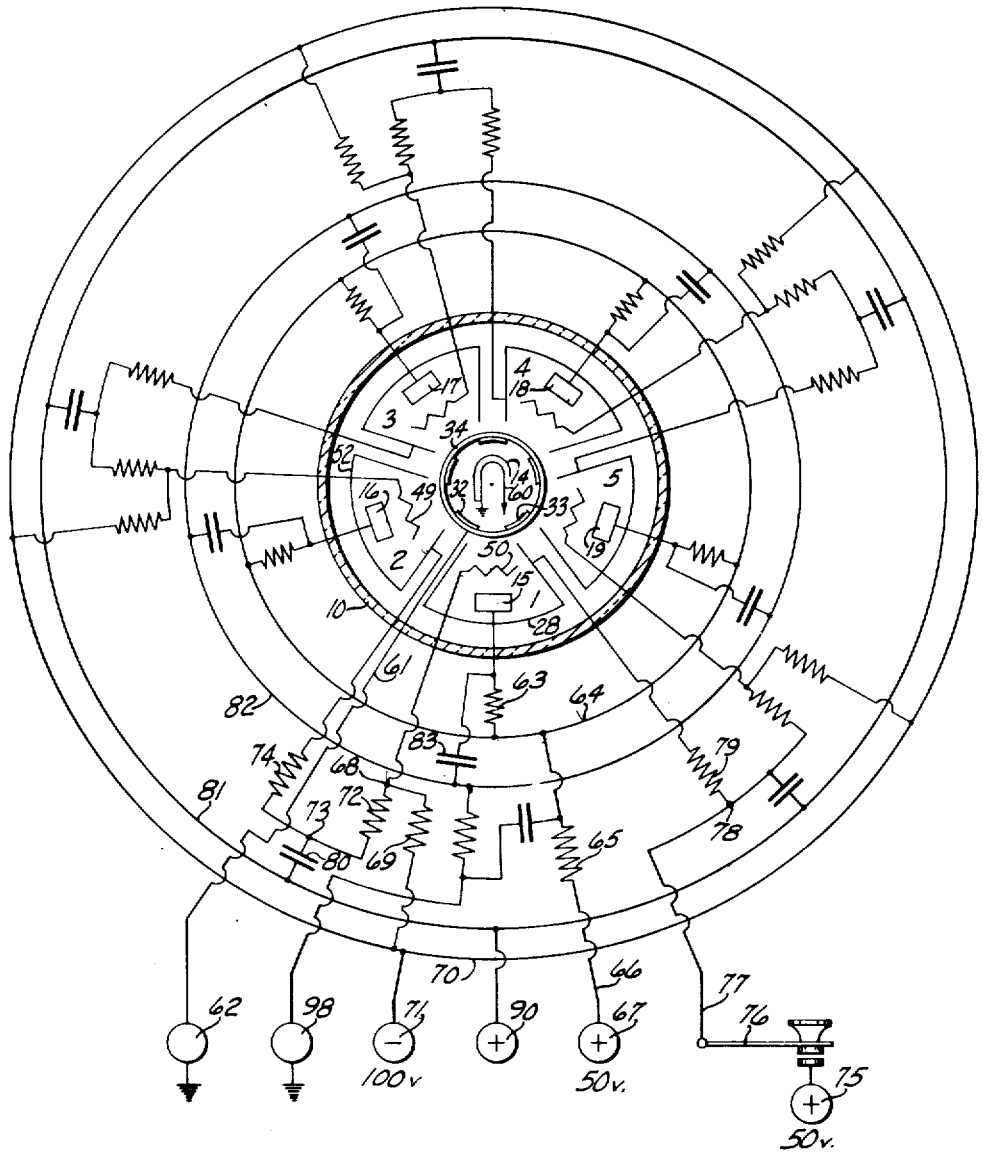
Fig. 4 is a typical circuit for operating the electron discharge device of Fig. 1 as a counting ring.

Thus, if tap member 50 (Fig. 1) is connected as shown in Fig. 4 to negatively-biased control grid 52, whatever change in potential is given to the normally negatively-charged tap member 50 by being in the dense ionized region adjacent anode 15, when said anode is conductive, is communicated to control grid 52 in the next adjoining cell-like section of the tube. In an actual operating circuit like that shown in Fig. 4, tap electrode members like member 50, connected with the associated control grid of the next adjoining section, are given a negative electric potential by being connected to a source of electric energy through a high resistance. When a discharge occurs to the anode 15, the associated cell-like region is highly ionized, and positive ions are attracted to the negatively-charged collecting member 50, making its potential more positive. This change in potential of tap member 50 is communicated to the next control grid 52, by the mentioned connection external to the envelope, and renders said next grid more positive, thus reducing its control over electron emission from the cathode.

The condition of discharge ionization in one cell-like section of the device increases somewhat the ionization of the gas medium in the envelope as a whole, as the segregation of the discharge ionization is not complete, bringing all the sections nearer a condition of discharge. However, with a proper balancing of energizing potentials of which disclosure is herein made, the shielding provided prevents the increase of ionization in non-discharging sections from reaching the point of overcoming the grid control.

The next section of the device whose control grid is thus primed for a discharge need not necessarily be adjacent to the conducting section to whose current-tapping element connection is made. Inasmuch as the sections immediately adjacent a discharging section are, by being close to the origin of the discharge ionization, slightly more ionized than the other sections of the device, it has been found that it is more desirable to make the conductive connections between the tap member of one section and the control grid of another section in such a manner that the firing of the sections is by progressing around the tube in a sequence comprising steps of more than one section. Such operation will be discussed later in connection with Figs. 14, 15, 16, 17, 18, and 19. The principle of operation in the circuits will be explained as though the operation progresses around the device from section to section one step at a time. It will be apparent, after an understanding of the principle of operation, that the adjacence of the sections is not necessary to the change of the discharge from one section to another.

By proper connections, circuit elements, and potentials as set forth in essence in the Robert E. Mumma application for United States Letters Patent, Serial No. 364,716, before mentioned, and which will be repeated here in substance as adapted to a single ionizable gaseous medium, the electron device described may be operated by sections, represented by the anodes, in determined sequence not dependent on adjacence of the sections, in response to electric potential impulses received from an external source, one such impulse causing a step of operation in sequence (for example, where the progression is from one section to the next adjacent section, from anode 15 to anode 16) followed by the extinguishment of any discharge of electrons to the previously conductive anode.

As will be explained, it is also possible, with the structure as disclosed, to have the sections operate in sequence by their own interaction without the receipt of any external potential impulses.

*Operating circuit for the electron discharge device of Figs. 1, 2, and 3*

In the consideration of the operating circuit (Fig. 4) for the electron discharge device disclosed in Figs. 1, 2, and 3, for the electric potentials given, the corresponding resistors and capacitors will be given, as an example, for operating the tube one section at a time in determined sequence in response to electric potential impulses received from an external source. The potentials will be given with respect to ground potential.

The elements of the device are shown in conventional manner in Fig. 4 and are given the same reference numerals as the corresponding parts in Figs. 1, 2, and 3. It will be assumed that the gas in the envelope is argon at a pressure such that discharge ionization takes place at the proposed potentials. The cathode 14 (Fig. 4) is grounded and heated indirectly by filament 60 energized by an independent source of electric current, not shown. Shielding members 32, 33, etc., and the common supporting rings like ring 34 are connected by conductor 61 to grounded terminal 62. Each of the anodes 15, 16, 17, 18, and 19 is connected through a resistor like resistor 63 of 5,000 ohms to a common conductor 64, which is connected through resistor 65 of 300 ohms and conductor 66 to terminal 67 of 50 volts positive potential. Each current-tapping electrode member is connected like member 50 through a point, like point 68, and a resistor of 500,000 ohms, like resistor 69, to a common conductor 70 connected to terminal 71 supplied with a negative electric potential of 100 volts. Each current-tapping electrode member, like member 50, is also connected through a point, like point 68, a resistor of 500,000 ohms, like resistor 72, a point, like point 73, and a resistor of 50,000 ohms, like resistor 74, to the control grid of the next section as control grid 52 of section 2, so numbered. The elements of the device are so arranged and spaced that, with the cathode at ground potential, the anodes at 50 volts positive potential, the current-tapping members at 100 volts negative potential, and the control grids at 100 volts negative potential, no section will "fire," but, if a control element of a selected section is given an excessive positive potential (for example, 50 volts), that section will "fire" and become conductive. When any one section has become conductive, the two sections adjacent to this section may be rendered conductive by causing the control element to become 10 volts negative in potential with respect to the cathode. A 50-volt positive electric potential supply terminal 75 may be connected, for example, by a key switch 76 and a conductor 77 to a point like point 78, which is connected through resistor 79 of 50,000 ohms to the control grid 28 of section number "1," thus causing that section to "fire" and become conductive when switch 76 is closed. Any other section desired may be so fired to begin operation of the device, or any other method of firing a section may be employed. Considering the section "1" as conductive—that is, a discharge of electrons flowing from cathode 14 to anode 15—a highly-ionized region of gas will surround the negatively-charged tap member 50. Being negatively charged, tap member 50 will attract large numbers of positive ions and, because of resistor 69, will become more positive and consequently will cause the control grid 52 of section "2" to become more positive, being connected thereto through point 68, resistor 72 of 500,000 ohms, point 73, and resistor 74 of 50,000 ohms. The actual potential of control grid 52 of section "2," while section "1" is conductive, with the circuit values and discharge characteristics given, will be approximately 30 volts negative, as compared to 100 volts negative potential on the control grids of sections 3, 4, and 5. Grounded member 32 prevents the migration of ions from section "1" to section "2" from becoming so great as to upset the combined effective control of grid 52 at 30 volts negative and tap member 49 at 100 volts negative potential. The 50-volt anode-cathode potential selected is such as to keep the intense discharge ionization of a conductive section largely confined within the walls of the associated control grid and associated portion of the mica discs so as not to cause excessive ionization in the remainder of the envelope and gaseous medium and thereby to cause a consequent anomalous discharge in the next section of the device which has had its control grid bias reduced. It is to be noted that some ionization will appear in other parts of the envelope when any section is conductive, but, by use of the shielding members, as members 32 and 33, the cell-like grids, and proper anode-cathode potential, such ionization, caused by migratory discharge-produced ions, is below the threshold of that required for breaking down the control of the discharge control elements and the current-tapping members of non-conductive sections, whether or not the effective bias against discharge has been reduced.

Assuming that section "1" has been rendered conductive by the closing of key-switch 76 and that section "2" is less strongly biased against "firing" than sections "3," "4," or "5" by reason of its control grid 52 being at 30 volts negative potential, whereas the control grids of sections "3," "4," and "5" are at 100 volts negative potential, it is evident that the application of a positive potential impulse to the control grids of all the sections of a high enough value to bring control grid 52 to the firing potential of 10 volts negative without bringing the control grids of sections "3," "4," and "5" to firing potential, which is somewhat more positive than ten volts negative, then section "2" will "fire" and become conductive. Points corresponding to point 73 are connected through a small capacitor, like capacitor 80 of the value of 50 microfarads, to a common conductor 81, which is connected to terminal 90, to which terminal 50-volt positive potential impulses are applied in selected numbers as desired. Each anode normally at 50 volts positive potential, as has been said, contains in its potential supply circuit a resistor, like resistor 63, of 5,000 ohms, which causes a 35-volt drop in the potential of the anode of a section as that section fires, there being no resistance in the cathode conductor to ground and the internal potential drop in a gas tube of this sort being approximately 15 volts if argon is used as the gaseous medium. Each anode is connected through a capacitor of .05 microfarad value, such as capacitor 83, to a common conductor 82, and therefore, as a section of the device fires, a 35-volt negative potential impulse is impressed on conductor 82 and thereby is impressed on all the other anodes of the tube. If any other section be conductive, its anode will be driven temporarily from 15 volts positive to below ground potential, thus extinguishing the conductivity in that section and allowing the control grid to resume control. Thus, only one section of the device is conductive at a given time, as the act of "firing" a section extinguishes conductivity in all the other sections. Assuming section "1" to be conductive, the application of a 50-volt positive potential impulse to terminal 90 will cause section "2" to fire and become conductive and cause section "1" to be extinguished. The next positive impulse impressed on terminal 90 will cause section "3" to fire and become conductive and cause section "2" to be extinguished. Therefore, a series of impulses impressed on terminal 90 will cause the sections of the device to be operated or rendered conductive in sequence. The sequential operation will proceed around the device, and, when section "5" is conductive, section "1" is primed by having its control grid potential reduced and will "fire" on the next received impulse.

Therefore, the sections of the electron device, as described, will fire sequentially as long as firing impulses are received. A series of three impulses received by the terminal 90 when the section "2" is conductive will cause sections "3," "4," and "5" to be conductive in succession, leaving section "5" in conductive condition. The described electron discharge device may be used as an accumulator of numerical data, the anodes each representing a digit of a denomination, just as the individual tubes represent digits in counting rings such as those described in the application for United States Letters Patent of Joseph R. Desch and Robert E. Mumma, Serial No. 325,040, to which reference has been made. The electron discharge device as described, having but five sections, will accumulate data on a numerical base of five. Figs. 9 to 13 inclusive, to be discussed hereinafter, disclose a device having ten sections for accumulating data on a base of ten, which is adapted for use with the decimal system of numbers. Any number of sections may be provided to deal with any system of numerical notation, the invention not being restricted to the number of sections shown in the drawings.

Points corresponding to point 73 may be sensed in any well-known manner operable by a change of electrical potential to discover which section of the device is in a conductive condition, as these points receive about a 70-volt potential change, as the section associated with the collecting member, such as member 50, is conductive. The Mumma application Serial No. 364,716 and the Desch and Mumma application Serial No. 325,040, to which reference has been made, each show an electron tube relay method of sensing such a change in electric potential so that conduction in a section may be made apparent apart from the visible glow of the conductive section. It will also be evident that the anode potentials may be sensed to determine the conductive section, as the resistor in each of the anode circuits causes a drop in potential if the associated anode is conductive.

A mode of operation of the novel electron discharge device other than that which has just been described is its use as an electric impulse producing device. It is apparent that, if the common anode-cathode potential of the sections is raised until the potential at which the control grid loses control is 30 volts negative, then the conduction in one section causes the firing of the next section immediately without the intervention of impulses from an external source such as through terminal 90. Under such circumstances, the speed of sequential operation of the device is limited only by the de-ionization time factor and by the time-lag caused by resistance and capacitance characteristics of the circuit. Under the values given for the disclosed circuit, the sections will "fire" with a frequency of about 10,000 per second. Conductor 81 will receive impulses of positive polarity at the mentioned frequency, and conductor 82 will receive potential impulses of the same frequency of negative polarity and of considerable potential.

It will be apparent that, in the construction of the electron discharge device, the spacing, size, and shape of the elements are important in determining and affording convenient values of circuit characteristics and potentials for operation. Nevertheless, the invention is not to be deemed restricted to the particular shape of the elements shown or their particular relation in space, but should be considered as including any single gaseous medium containing a cathode common to a plurality of anodes which are coupled so as to operate or become conductive, on the application of operating potential, one anode at a time in determined endless chain sequence either in response to individual potential impulses from an outside source or by self-operating interaction.

Two modifications of structure incorporating the essential principles of the invention are disclosed and will be next described.

*The electron discharge device disclosed in Figs. 5, 6, and 7*

Figure 8:
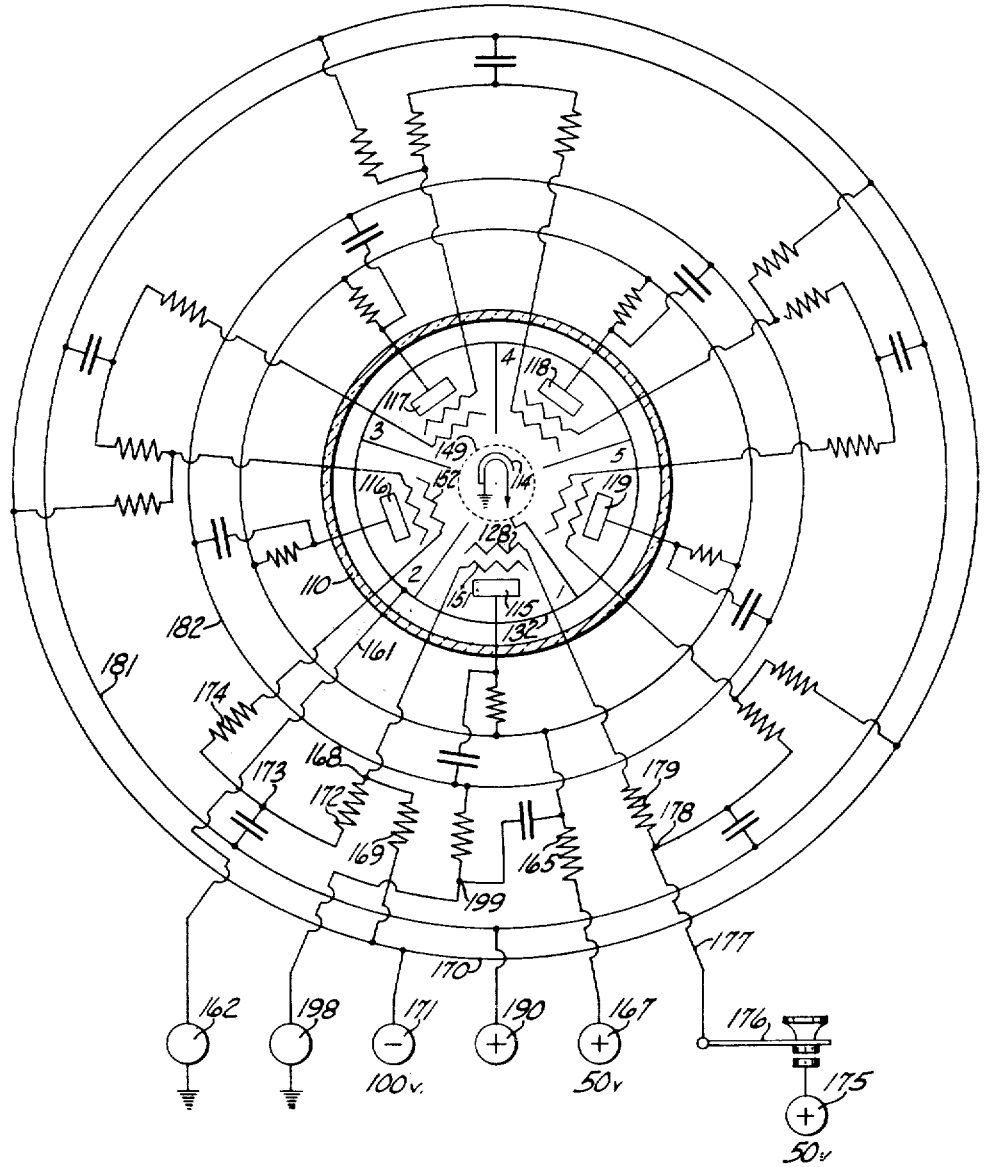
Fig. 8 is a typical circuit for operating the sections of the five-section electron discharge device of Fig. 5 as a counting ring.

Referring to Figs. 5, 6, and 7, which show an electron discharge device with five anodes 115, 116, 117, 118, and 119 surrounding a cathode 114 like the device shown in Fig. 1, enclosed within an envelope 110 containing one of the rare ionizable gases. In this embodiment of the invention, to prevent migration of the highly-ionized gas adjacent a conducting anode to other anodes in the envelope, a shield is provided for enclosing each anode, said shields being of sector-shaped cross-section and having an elongated opening toward and in close proximity to the cathode, like shield 132 surrounding anode 115. The radial portions of adjacent shields are fastened together around supporting rods, such as rods 129 and 130, which are held in holes in an upper insulating disc 112 (Fig. 6) and a lower insulating disc 113. The insulating discs and shields form a cell for each anode similar to those described in connection with Fig. 1. The shields like shield 132 (Fig. 5), for all the anodes are connected to a conductor 138 by one of the support rods, like rod 130, which conductor leaves the envelope 110 through press 111. The shields like shield 132 act both as mechanical and as electrostatic shields, being grounded as shown in the circuit of Fig. 8. The discharge control grids consist of a U-shaped rod, best seen in Fig. 5, located between each anode and the cathode, the discharge control grid for anode 115 being designated 128. One end of each of the U-shaped grids is connected to a conductor, like conductor 131, which leaves the envelope through press 111. A shield cap 148 for the cathode 114 is connected to and supported by rod 130 by means of a conductor strap 147. The construction of the rest of the device is substantially the same as the construction of the device of Figs. 1, 2, and 3. The circuit shown in Fig. 8 connects the elements of the modified five-section device in the same manner and with the same values of capacity and resistance as the corresponding elements shown in the circuit of Fig. 4, connecting the elements of the first-described five-section device disclosed in Figs. 1, 2, and 3. The elements of Figs. 4 and 8 having the same function have been given the same reference numerals, except that those of Fig. 8 have one hundred added to each numeral.

*The electron discharge device disclosed in Figs. 9, 10, 11, and 12*

Figure 13:
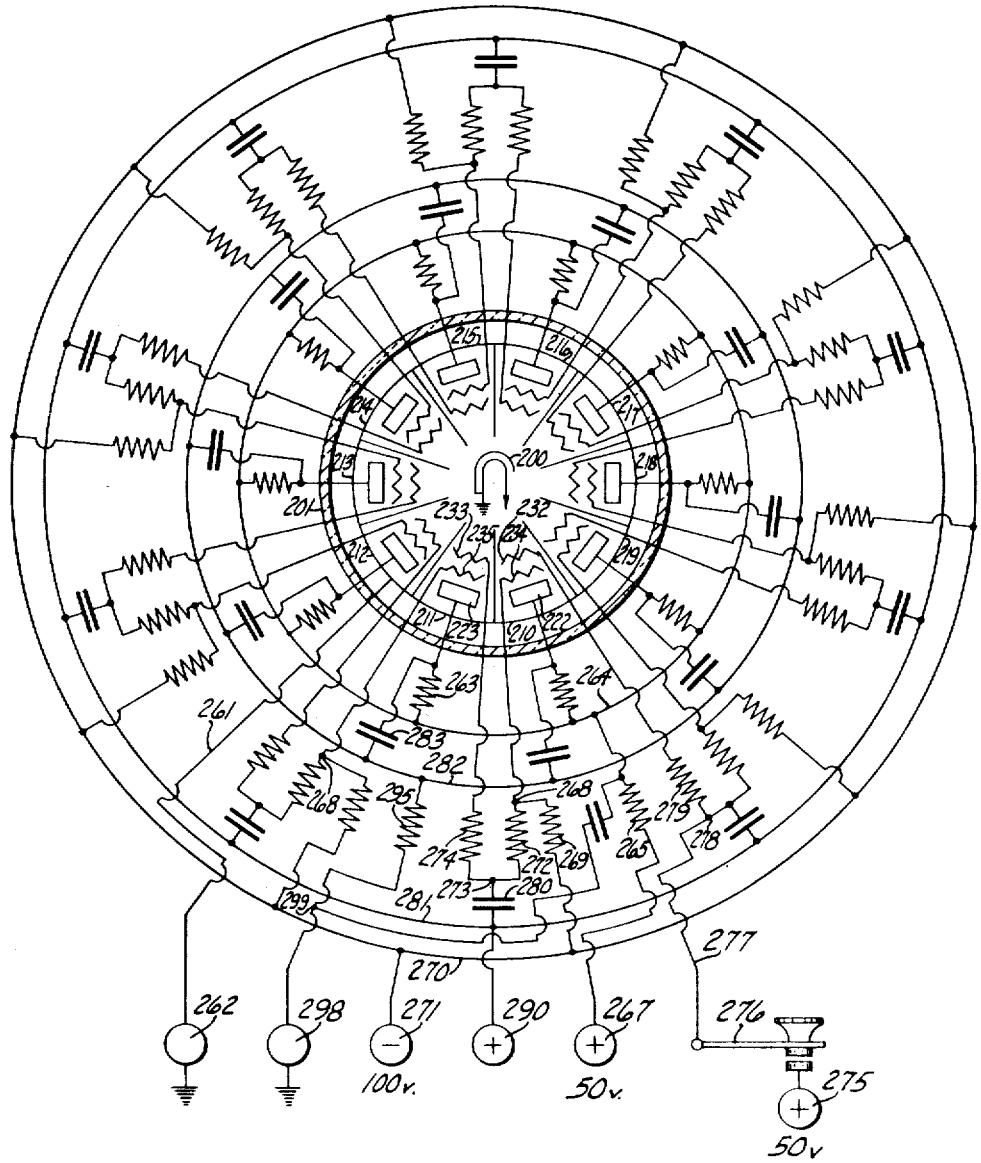
Fig. 13 is a typical circuit for operating the electron discharge device of Fig. 9 as a counting ring.

A ten-section electron discharge device incorporating the principles of the invention is shown in Figs. 9, 10, 11, and 12, wherein the electrode and the control elements shown in Figs. 9, 10, and 11 as connected and energized in the manner shown in Fig. 13 perform the same function as that performed by the devices shown in Figs. 1 and 5.

An envelope 201 (Figs. 9 and 10), having an upper stem 202 with a press 204, and a lower stem 203 with a press 205, is provided, like the envelopes previously considered, with an ionizable gaseous medium, such as argon.

Supported between an upper insulating disc 206 (Fig. 10) and a lower insulating disc 207 is an assembly of electrodes and control elements comprising a central vertical indirectly-heated cathode 200 connected to and supported by leads 208 and 209, which leave the envelope through press 205. Surrounding the cathode 200 (Figs. 9, 10, and 11) are ten shielding members 210, 211, 212, 213, 214, 215, 216, 217, 218, and 219, each having a sector-shaped cross-section and each of whose sides are radial to cathode 200. The sectors extend from the top disc 206 to the bottom disc 207, and the radial sides of adjacent sectors are fastened together and form a complete circular assembly around the cathode, which assembly is enclosed by the top and bottom discs 206 and 207. Support rods, like rod 200 (Fig. 9), gripped between the sides of adjacent sectors fastened together, pierce the discs, said rods being provided with retaining ears clamping the discs to the sectors to hold the assembly together. The whole shielding assembly of ten sectors is connected to a conductor 221 (Fig. 9), which leaves envelope 201 by means of press 204. The conductor 221 and other like conductors held in the presses 204 and 205 support the assembly of electrodes and shielding members within the envelope. Nested in each cell-like sector and extending between the top and bottom discs 206 and 207 is a trough-shaped anode having a U-shaped cross-section like anode 223 in sector 211 (a detail of a form of one of the anodes is shown in Fig. 12), with the opening and edges of the trough facing cathode 200 and the edges of the trough being parallel with the axis of the anode. The anodes are supported by rods fastened to their sides, like rods 224 and 225, wh'ch are extended into the insulating discs 206 and 207. One of such rods of each anode—for example, rod 225 (Fig. 9)—is connected to a conductor like conductor 226, which conductor leaves the envelope through press 205, for example. To suit the convenience of the constructor, the various conductors may leave the envelope by one or the other of the presses, the two presses being provided because of the large number of conductors required. Each of the anodes is covered on the outer surface with insulation 227 (Fig. 12) such as glass or other ceramic material to prevent electrons from coming into contact with the outside surface of the anode. Portions of the inner surface of each of the anodes near the edges of the trough opening are also coated with insulating material to keep electrons from coming into contact therewith. This inner insulating coating 228 extends only part of the way into the interior of the anode and leaves the inside rear surface 230 of the anode exposed so as to be contacted by electrons. The edges 231, representing the thickness of the material of which the anode is made and which edges face the cathode, are not covered with the insulating material. The purpose of the insulation on the anodes will be explained later. The discharge control grids each consist of a rod, like rod 233 (see Fig. 10), placed vertically between the cathode and the uninsulated edges of the associated anode, as shown also in Fig. 11. Each control grid is connected like grid rod 233 (Fig. 10) to a conductor like conductor 236, which leaves the envelope through one of the presses, like press 204. A current-tapping member is provided for each anode like member 235 (Figs. 10 and 11) associated with anode 223, consisting of a vertical rod positioned within the confines of the anode. Each of these tapping members is connected externally of the envelope to the control grid of an adjacent section, as are the current-tapping members of the five-section devices previously described. Therefore, it is readily seen that, the uninsulated edges of the anode being nearer the cathode than the associated tapping member, the tapping member is thereby rendered practically impotent to prevent the firing of the section, even though it is given a high negative potential, such control being substantially maintained by the discharge control grid. Therefore, it is not necessary in this construction that the cathode-anode potential be large enough to overcome a negative charge on the tapping member to have a section "fire." The "firing" of a section is practically uninfluenced by the potential on the associated tapping member, and yet, when the conduction is started between the leading edges of the anode and the cathode, the bare inside surface at the rear of the anode, because of the discharge ionization, will receive most of the electrons because of its greater area, and the current-tapping member is situated in the region of highest ionization, where it, if given a high negative potential, is very efficient in picking up positive charges and thus lessening the control of the control grid of the next section so as to make it responsive to the next commonly received positive potential impulse.

The circuit for operating the device shown in Fig. 9 is shown in Fig. 13. The envelope 201 is shown as described, containing a rare inoizable gas such as argon, a grounded cathode 200, and ten anodes, of which anodes 222 and 223 are typical, said ten anodes each being connected to a common conductor 264 through a resistor of 5,000 ohms like resistor 263. Conductor 264 is connected, through resistor 265 of 300 ohms, to a 50-volt positive electric potential supply terminal 267. Each anode is also connected to a common conductor 282 through a capacitor of .05 microfarad, like capacitor 283, which common conductor is grounded through a resistor 295 of 25,000 ohms. Within the envelope and associated with each anode is a control grid, like grid 233 associated with anode 223, connected to a common external conductor 270 through a resistor, like resistor 274 of 50,000 ohms, a point, like point 273, a resistor of 500,000 ohms, like resistor 272, a point, like point 268, and a resistor of 500,000 ohms, like resistor 269. Also within the envelope and associated with each anode is a current-tapping member, like member 234 associated with anode 222, connected outside the envelope 201 with the control grid as grid 233 of the next adjacent anode at a point, like point 268. The shielding members, 210 to 219 inclusive, are electrically connected within the envelope and are grounded by conductor 261 to terminal 262. Points corresponding to points 273 are connected each through a capacitor, like capacitor 280 of 50 microfarads, to a common conductor 281 connected to terminal 290, which receives the 50-volt positive potential impulses necessary to operate the device selectively step by step. Points corresponding to points 268 are connected each through a resistor, like resistor 269, to the common conductor 270, which is connected to a terminal 271 supplied with 100 volts negative electric potential.

By means of the key-switch 276, 50 volts positive potential may be impressed on conductor 277 and points 278 to "fire" the section of which anode 222 is representative, in a manner which has been explained in connection with the circuits of Figs. 4 and 8. As is the case with the devices of Figs. 1 and 5, for each impulse of 50 volts positive potential given terminal 290, the state of conductivity of the device of Fig. 9 will change from anode to anode in determined sequence for the reasons given heretofore.

*The electron discharge device applied to numerical counting*

It is evident that, when used in numerical counting, the number of sections in a device embodying the invention may be increased or decreased to meet the demands of the mathematical notation being used. It is also possible to use a device having many sections for purposes requiring few sections by by-passing the unrequired sections. Thus, in dealing with a typical system of numbers, the decimal system, devices having ten sections equal in number to the digits in a denomination may be used. In the decimal system of numbers, the ten-section device may represent the digits "1", "2," "3," "4," "5," "6," "7," "8," "9," and "10" or "0".

As before stated, the sectors in the sequential order of "firing" need not be adjacent and preferably are not adjacent. The arrangement and numeration of the sections of the devices shown in Figs. 4, 8, and 13 were selected as the best for showing the circuits involved. Fig. 14 shows the method described of firing the ten-section device one step at a time, the arrow showing the "1" and "2" cells as adjacent. Figs. 15 and 16 show, respectively, means for progressing around the device in either a clockwise or a counter-clockwise manner three steps at a time, the arrows indicating the connection between the current-tapping member of the lower numbered section to the next higher numbered section. In a ten-section device, such arrangement of the sectional connections by steps of three gives perfect uniformity of operating conditions. Fig. 17 shows the method described of firing the five-section devices, whose circuits are described in Figs. 4 and 8. Figs. 18 and 19 show, respectively, the method of firing the five-section device in a counter-clockwise manner and a clockwise manner by steps of two, which will give perfect uniformity of operating conditions.

The sections may also be connected for operation in a random scheme or in any other regular scheme. It must be remembered that if one of the other schemes of firing be used, that is to non-adjacent sections, the circuit constants must be changed so the primed section will fire with the grid at a potential negative with respect to the cathode. Such change may be accomplished by increasing the plate potential to 100 or 125 volts positive with respect to the cathode.

It is apparent that the operation of a device may be discontinued at any point by breaking the connection between a selected tapping member and the next control grid by switch means, and the device is therefore adaptable, by use of a higher anode-cathode potential, as described previously, for the purpose of producing a selected number of potential impulses by causing the device to operate from the "1" section to the selected section automatically and taking off such impulses on the conductor electrostatically coupling all the anodes.

The device may be used as a frequency divider or multiplier according to whether it is used to respond to or to produce impulses; thus, one complete operation of the device shown in Fig. 9 would require ten incoming pulses, thus dividing the incoming frequency by ten, and by starting automatic operation of the device by a single incoming pulse, ten times as many pulses could be produced.

While the structure herein shown and described is admirably adapted to fulfill the objects primarily stated, it is to be understood that it is not intended to confine the invention to the forms or embodiments herein disclosed, for it is susceptible of embodiment in various forms all coming within the scope of the claims which follow.

What is claimed is:

1. An electron gas discharge tube having a cathode; a plurality of anodes; a discharge control element adjacent each anode; and a current-tapping member adjacent each anode positioned in the gaseous medium between the anode and on one side and the cathode and the discharge control member on the other side.

2. An electron tube comprising an envelope; an ionizable medium in the envelope; a cathode; an anode having a concave surface facing the cathode; and a current-tapping member positioned within the confines of the concave surface of the anode, one part of the anode being nearer the cathode than is the current-tapping member.

3. An electron tube comprising an envelope; an ionizable medium in the envelope; a cathode; a plurality of concave anodes mounted around the cathode having a U-shaped cross-section with the opening faced toward the cathode, and coated on the convex side and on the arms of the concave side with insulating material of a nature to keep electrons from contacting the anode at those points, said coating being omitted from the thickness of the anode material nearest the cathode; and a charge-collecting member positioned within the concavity of each of the anodes.

4. An envelope containing an ionizable medium; a plurality of electrostatic shielding members each forming a cell having an aperture pointed toward but spaced slightly from a common center; an anode positioned centrally in each sealing member; and a cathode positioned along the common center of the cell apertures.

5. In an electron gas discharge device, the combination of a plurality of anodes; a cathode common to the anodes; an ionizable medium enveloping the anodes and the cathode; said ionizable medium together with said anodes and said cathode providing a plurality of anode-cathode discharge paths; means controlling the conductivity in the anode-cathode paths whereby the various anode-cathode discharge paths may be rendered conductive in sequence, said means including two control members intermediate the cathode and each anode, one of said control members being for controlling the space charge and the other of said control members supplementing the space charge control and acting to tap current from the anode glow region; and coupling means to transfer said tapped current from the current-tapping member in one anode-cathode discharge path to the space charge control member in the anode-cathode discharge path to be rendered conductive next in the sequential series.

6. An anode having a U-shaped cross-section; a coating of insulating material on the convex portion of the anode to prevent contact of electrons with the anode; and a coating of the same insulating material on the concave surface of the anode except the interior half thereof, said insulation not covering the thickness of the anode.

7. A gas electron discharge tube comprising an anode having a U-shaped cross-section; a coating of insulating material on the convex portion of the anode to prevent contact of electrons with the anode, and a coating of the same insulating material on the concave surface of the anode except the interior half thereof, said insulation not covering the thickness of the anode; a cathode mounted opposite the concave surface of the anode; an ionizable gaseous enveloping medium; and a current-tapping member positioned in the gaseous medium within the concave portion of the anode, said member if charged negatively not exerting complete control of the discharge as the edges of the anode are nearer the cathode where they may support an ionizing current.

8. A cathode; a plurality of cells each containing an anode positioned to receive electron emission from the cathode; a common ionizable medium enveloping the cathode, the cells, and the anodes; said anodes, together with said cathode, providing a plurality of discrete anode-cathode discharge paths extending into said cells; means coupling the anodes electrostatically for mutual extinguishing action whereby but one anode-cathode discharge path at a time can be conductive; and inter-cell connections conductively connecting that part of the ionizable medium enclosed in one cell with that part of the ionizable medium enclosed in another cell tending to cause a discharge in the other cell when the first cell is conductive, the last of said inter-cell connections being with the first cell forming an endless operative chain.

9. In a gas discharge electron device having an ionizable gaseous medium, the combination of a plurality of anodes arranged in a ring in the gas, the anode glow region of each anode being segregated by electrostatic and mechanical means from the other anodes; a cathode common to all the anodes; and control means including connections conductively connecting each anode glow region with the space discharge region for the next adjacent anode.

10. In a gas electron discharge tube, the combination of electron emission means; a plurality of anodes having a U-shaped cross-section, said anodes being arranged around the electron emission means with the concave side presented to said emission means; connections for giving all of said anodes operating potential; means coupling all the anodes together electrostatically for mutual extinguishing action; an ionizable medium enveloping the elements of the tube; a space charge control grid associated with each anode but located near the emission means; and a current-tapping member located in the anode glow region of each anode and connected conductively with the space charge control grid of an adjacent anode, said connections between the current-tapping members and the control grid conductively connecting the anode glow region associated with one anode with the space charge region associated with the next adjacent anode in an endless operative chain whereby the anodes may be caused to conduct successively in a self-operating manner.

11. In a gas electron discharge tube, the combination of electron emission means; a plurality of anodes having a U-shaped cross-section, said anodes being arranged around the electron emission means with the concave side presented to said emission means; connections for giving all of said anodes operating potential; means connecting all the anodes together electrostatically for mutual extinguishing action; an ionizable medium enveloping the elements of the tube; a space charge control grid associated with each anode but located near the emission means; and a current-tapping member located in the anode glow region of each anode and connected conductively with the space charge control grid of an adjacent anode, said connections between current-tapping members and space charge control grids conductively connecting the anode glow region associated with one anode with the space charge region associated with the next adjacent anode in an endless operative chain whereby the anodes may be caused to conduct successively in response to electric impulses impressed on the control members.

12. In an electronic device including an electron tube comprising an envelope and an ionizable medium in the envelope, the combination of a plurality of anodes and a cathode in the common gas medium; means including a substantially enclosing cell around each anode causing segregation of discharge ionization to the vicinity of a conducting anode upon conduction starting between the cathode and an anode; a common supply conductor for the anodes to which each is connected through a resistor; electrostatic means coupling the anodes so that an extinguishing electric potential impulse is conveyed to the other anodes upon conduction commencing in any cell so that any of the anodes, but only one at a time, may receive electrons from the cathode; and means connecting the gaseous mediums of adjacent cells rendered operable by ionization of the gas in one cell to cause conduction to occur in the connected cell.

13. In an electronic device including a gas-filled electron tube, in combination, a cathode; a plurality of anodes; said anodes and cathode forming a plurality of anode-cathode discharge paths; control means to cause the anode-cathode paths to become conductive one after another in sequence; means connecting each anode through a resistance to a common potential supply conductor; and means coupling the anodes electrostatically to a common conductor whereby the act of conduction beginning in any anode-cathode path will cause conduction to cease in any previously conducting anode-cathode path, thus allowing but one anode at a time to receive cathode-emitted electrons.

14. In an electronic device including an electron tube comprising an envelope and an ionizable medium in the envelope, the combination of a plurality of anodes and a cathode in the common gas medium; means including a substantially enclosing cell around each anode causing segregation of discharge ionization to the vicinity of a conductive anode upon conduction starting between the cathode and an anode; a common supply conductor for the anodes to which each is connected through a resistor; and electrostatic means coupling the anodes so that an extinguishing electric potential impulse is conveyed to the other anodes upon conduction commencing in any enclosing cell whereby any of the anodes, but only one at a time, may receive electrons from the cathode.

15. An electron tube comprising an envelope; an ionizable medium in the envelope; a central cathode; a plurality of anodes arranged in a circle about said cathode, said cathode and anodes providing a plurality of discrete anode-cathode discharge paths extending radially from the cathode to the various anodes; a control member for each discharge path to control the conductivity of the path; a current-tapping member in each discharge path; circuits connecting the current-tapping members and control members for different discharge paths in an endless chain operative sequence so that conduction in the various paths will take place one after another in sequence; and electrostatic couplings between the anodes whereby the act of conduction beginning in any discharge path will cause conduction to cease in any previously conducting path, the connections between members and the electrostatic couplings between anodes being effective to cause electrons from the cathode to be received by each of the anodes in sequence.

16. A plurality of anodes; a cathode common to said anodes; an ionizable medium enveloping the anodes and the cathode; said ionizable medium, together with the anodes and the cathode, providing a plurality of discrete anode-cathode discharge paths; means for selectively rendering the various anode-cathode discharge paths conductive one after another in step-by-step sequence; and means for coupling the anodes together for mutual extinguishing action whereby the act of conduction beginning in one anode-cathode discharge path will extinguish conduction in any previously conducting discharge path and thus allow but one anode at a time to receive electrons from the cathode.

17. A device for producing electrical potential impulses, comprising a cathode; a plurality of anodes; a gaseous ionizable medium enveloping the cathode and the anodes; said ionizable medium together with said cathode and anodes providing a plurality of anode-cathode discharge paths; control means including connections between different anode-cathode discharge paths for rendering the various discharge paths conductive one after another in step-by-step sequence; and means to couple the anodes together for mutual extinguishing action so that the act of conduction beginning in any of the anode-cathode discharge paths will cause conduction in any previously conducting discharge path to be extinguished, said coupling including a conductor upon which potential impulses are impressed each time conduction begins in any of said anode-cathode discharge paths and from which said potential impulses may be obtained.

JOSEPH R. DESCH.
ROBERT E. MUMMA.

REFERENCES CITED

The following references are of record in the file of this patent:

UNITED STATES PATENTS

| Number | Name | Date |
|---|---|---|
| 2,044,618 | Livingston | June 16, 1936 |
| 2,272,492 | Weyher | Feb. 10, 1942 |
| 2,293,177 | Skellett | Aug. 18, 1942 |
| 2,172,316 | Bowie | Sept. 5, 1939 |
| 2,111,626 | Heising | Mar. 22, 1938 |
| 2,083,107 | Yerzley | June 8, 1937 |
| 1,913,427 | Bond | June 13, 1933 |
| 1,533,278 | Slepian | Apr. 14, 1925 |
| 1,925,104 | Morrison | Sept. 5, 1933 |
| 2,195,098 | Skellett | Mar. 26, 1940 |
| 2,012,837 | Tear | Aug. 27, 1935 |
| 2,145,088 | Kobel | Jan. 24, 1939 |
| 2,067,966 | Klemperer | Jan. 19, 1937 |
| 2,094,760 | Spencer | Oct. 5, 1937 |
| 2,206,271 | Spencer et al. | July 2, 1940 |
| 1,928,203 | Meyer et al. | Sept. 26, 1933 |
| 1,929,526 | Szrigeti | Oct. 10, 1933 |
| 1,933,396 | Smith | Oct. 31, 1933 |

FOREIGN PATENTS

| Number | Country | Date |
|---|---|---|
| 686,501 | France | Apr. 14, 1930 |

OTHER REFERENCES

Wynn Williams. The Use of Thyratrons for High Speed Automatic Counting of Physical Phenomena. Proce. Royal Soc. of London, series A, vol. 132, p. 295 (1931).

---

Certificate of Correction

Patent No. 2,432,608.      December 16, 1947.

JOSEPH R. DESCH ET AL.

It is hereby certified that errors appear in the printed specification of the above numbered patent requiring correction as follows: Column 4, line 68, for the words "top of" read *top to*; column 10, line 60, for "rod 200" read *rod 220*; column 11, line 74; for "inoizable" read *ionizable*; column 12, line 49, for "device" read *devices*; column 13, line 59, after the word "anode" strike out "and"; line 72, after "cathode" insert a comma; column 14, lines 10 and 11, for "sealing" read *shielding*; column 15, line 26, for "grid" read *grids*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.* tween different anode-cathode discharge paths for rendering the various discharge paths conductive one after another in step-by-step sequence; and means to couple the anodes together for mutual extinguishing action so that the act of conduction beginning in any of the anode-cathode discharge paths will cause conduction in any previously conducting discharge path to be extinguished, said coupling including a conductor upon which potential impulses are impressed each time conduction begins in any of said anode-cathode discharge paths and from which said potential impulses may be obtained.

JOSEPH R. DESCH.
ROBERT E. MUMMA.

REFERENCES CITED

The following references are of record in the file of this patent:

UNITED STATES PATENTS

| Number | Name | Date |
|---|---|---|
| 2,044,618 | Livingston | June 16, 1936 |
| 2,272,492 | Weyher | Feb. 10, 1942 |
| 2,293,177 | Skellett | Aug. 18, 1942 |
| 2,172,316 | Bowie | Sept. 5, 1939 |
| 2,111,626 | Heising | Mar. 22, 1938 |
| 2,083,107 | Yerzley | June 8, 1937 |
| 1,913,427 | Bond | June 13, 1933 |
| 1,533,278 | Slepian | Apr. 14, 1925 |
| 1,925,104 | Morrison | Sept. 5, 1933 |
| 2,195,098 | Skellett | Mar. 26, 1940 |
| 2,012,837 | Tear | Aug. 27, 1935 |
| 2,145,088 | Kobel | Jan. 24, 1939 |
| 2,067,966 | Klemperer | Jan. 19, 1937 |
| 2,094,760 | Spencer | Oct. 5, 1937 |
| 2,206,271 | Spencer et al. | July 2, 1940 |
| 1,928,203 | Meyer et al. | Sept. 26, 1933 |
| 1,929,526 | Szrigeti | Oct. 10, 1933 |
| 1,933,396 | Smith | Oct. 31, 1933 |

FOREIGN PATENTS

| Number | Country | Date |
|---|---|---|
| 686,501 | France | Apr. 14, 1930 |

OTHER REFERENCES

Wynn Williams. The Use of Thyratrons for High Speed Automatic Counting of Physical Phenomena. Proce. Royal Soc. of London, series A, vol. 132, p. 295 (1931).

Certificate of Correction

Patent No. 2,432,608.                                December 16, 1947.

JOSEPH R. DESCH ET AL.

It is hereby certified that errors appear in the printed specification of the above numbered patent requiring correction as follows: Column 4, line 68, for the words "top of" read *top to*; column 10, line 60, for "rod 200" read *rod 220*; column 11, line 74; for "inoizable" read *ionizable*; column 12, line 49, for "device" read *devices*; column 13, line 59, after the word "anode" strike out "and"; line 72, after "cathode" insert a comma; column 14, lines 10 and 11, for "sealing" read *shielding*; column 15, line 26, for "grid" read *grids*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*